United States Patent
Liebenow

(10) Patent No.: US 7,209,719 B2
(45) Date of Patent: Apr. 24, 2007

(54) HOME POWER LINE NETWORK CONNECTED PHONE

(75) Inventor: Frank Liebenow, Jefferson, SD (US)

(73) Assignee: Gateway Inc., Irvine, CA (US)

(*) Notice: Subject to any disclaimer, the term of this patent is extended or adjusted under 35 U.S.C. 154(b) by 394 days.

(21) Appl. No.: 10/761,994

(22) Filed: Jan. 21, 2004

(65) Prior Publication Data
US 2004/0162117 A1    Aug. 19, 2004

Related U.S. Application Data

(60) Provisional application No. 60/443,078, filed on Jan. 28, 2003.

(51) Int. Cl.
*H04B 1/04* (2006.01)
(52) U.S. Cl. ............ 455/127.1; 455/13.4; 455/74.1; 455/572
(58) Field of Classification Search ........... 455/13.4, 455/127.1, 402, 572, 74.1, 557; 379/167.01, 379/167.11, 167.13, 176, 185–186
See application file for complete search history.

(56) References Cited

U.S. PATENT DOCUMENTS

| | | | |
|---|---|---|---|
| 5,684,826 A | 11/1997 | Ratner | |
| 5,708,701 A * | 1/1998 | Houvig et al. | 379/173 |
| 5,864,607 A | 1/1999 | Rosen et al. | |
| 5,892,795 A * | 4/1999 | Paret | 375/222 |
| 5,911,119 A * | 6/1999 | Bartholomew et al. | 455/402 |
| 5,937,342 A | 8/1999 | Kline | |
| 6,246,868 B1 | 6/2001 | Bullock et al. | |
| 6,449,348 B1 | 9/2002 | Lamb et al. | |
| 6,741,162 B1 * | 5/2004 | Sacca et al. | 307/3 |
| 7,039,393 B1 * | 5/2006 | Kite | 455/412.2 |

OTHER PUBLICATIONS http://www.phonex.com/prd_readywire.htm Phonex Broadband / Ready Wire Powerline Home Communications.

* cited by examiner

*Primary Examiner*—Lana Le
*Assistant Examiner*—Tuan H. Nguyen
(74) *Attorney, Agent, or Firm*—Scott Charles Richardson; McGrath, Geisler, Olds & Richardson; Jeffrey A. Proehl

(57) ABSTRACT

The present invention is directed to a cellular or cordless phone whereby power line networking is either integrated within its base station and/or charger or added as a module that can be installed into the base station and/or charger, providing a method of transferring network data between the cellular or cordless phone and another processing element connected to the power line without any additional cables.

42 Claims, 3 Drawing Sheets

HOME POWER LINE NETWORK CONNECTED PHONE

BACKGROUND OF THE INVENTION

This application is related to, and claims priority to U.S. provisional application No. 60/443,078, filed Jan. 28, 2003, entitled "APPARATUS AND METHODS OF NETWORKING DEVICES, SYSTEMS AND COMPUTERS VIA POWER LINES," the entirety of which is incorporated by reference herein, including all of the documents referenced therein. Additionally, this application is related to U.S. application titled, "POWER SUPPLY WITH MODULAR INTEGRATED NETWORKING," which was filed on even date herewith, now issued as U.S. Pat. No. 6,972,688 to inventor Mark Rapaich and is related to U.S. application titled, "MODULATED DATA TRANSFER BETWEEN A SYSTEM AND ITS POWER SUPPLY," which was filed even date herewith, now issued as U.S. Pat. No. 6,989,734 to inventor Keith Thomas.

FIELD OF THE INVENTION

The present invention generally relates to the field of cordless and cellular telephones, and more particularly, where such telephones network with and interact with a computer system. The present invention provides a method of transferring network data between the computer system and the telephone using power line networking.

BRIEF DESCRIPTION OF THE RELATED ART

Cordless and Cellular phones are in widespread use. There are very few households in the United States that don't have at least one of a cordless and cellular phone. The tendency of manufacturers of these phones is to make them smaller and smaller, while increasing the features and capabilities at the same time. For example, it is almost standard for a cordless phone to have a memory dialer or address book. Likewise, most every cellular phone has a memory of phone numbers. Newer cellular phones also have access to the internet and the ability to take photographs. Both types of phones have a secondary power source, such as a battery, that is rechargeable. Both types of phones usually connect to a base station or charging adapter for charging this battery, and that base station or adapter connects to the power line for energy to operate and/or charge the batteries.

Providing all of this functionality in an ever shrinking form factor presents many user interface challenges. The displays are small and for some, hard to read. The keypads and touch screens are limited, making it difficult to enter alpha-numeric data. Today's phones overcome this limitation by reusing existing keys to represent several alpha-numeric characters. For example, to enter a "C", the user must press the "2" key four times. The first press enters a "2", the second press enters an "A", the third press enters a "B" and the fourth press enters the desired "C". Even though this interface works, it is tedious to use and requires much time and patience, especially when copying an address book to a new telephone.

Additionally, as these telephones increase in functionality, more information may be kept in the phone that may be needed in the user's computer system. For example, text messages and email messages may be received and viewed in the phone, but being that the phone has significantly lower storage capabilities than a typical computer, message archival is very limited. It would be useful have a way to transfer messages, notes, text and the like from the telephone to the user's computer system for later viewing, searching and archiving. Furthermore, there may be files located on the user's computer that might be needed on their telephone. The user may wish to copy part or all of their address book form their computer system to their telephone. The user may wish to copy some or all of their internet favorites from the computer system's browser to their telephone, especially considering the difficulty in entering internet web addresses on the telephone's keypad.

It would be possible to connect the user's computer system to their phone through a cable, but for many, the computer system is located in a different location in their home, other than where their phone base station or charger might be. Furthermore, even if the computer was in a convenient location, additional cables would be required above and beyond the power cable required to obtain energy to charge the phone. There are several forms of networking available today. It would also be possible to connect the phone to a computer using networking, include networking over dedicated wires such as IEEE Standard 802.3, wireless networking such as IEEE Standard 802.11, wireless personal area networking such as Bluetooth and, more recently, networking over existing wires, including phone lines (Home Phone Line Alliance) or power lines (HomePlug™ Power Line Alliance and X.10 standards). Networking over power lines has recently become viable with technology promoted by the HomePlug™ Powerline Alliance. This technology is especially useful for systems that generally require an external power source when operating, as the phone charger or base station in this invention.

Being that cordless and cellular phone base stations and chargers are generally connected to AC power in order to receive operating and charging power, it would be advantageous to integrate the power line networking into said base station and charger. In that, the charger or base station can provide charging power as well as networking from the same connection to household power.

The integration of power line networking into the base station and/or charger could also be provided as a module that could be inserted into the base station and/or charger and said module would connect to the AC power source through the base station and/or charger and perform all power line network functions required by the phone. Furthermore, network data can be transferred between the phone and charger and/or base station through a separate cable, a separate connection on a connector or the data can be modulate over the charging power coming from the base station and/or charger. The later is the subject of a related application referenced above.

SUMMARY OF THE INVENTION

The present invention is directed to a cellular or cordless phone whereby power line networking is either integrated within its base station and/or charger or added as a module that can be installed into the base station and/or charger. The present invention is further directed to a method of transferring network data between the cellular or cordless phone and another processing element connected to the power line without any additional cables. With this invention, a power line networking enabled base station and/or charger can be installed into a system by connecting to only the home power line, thus being simple for the user to install, allowing distant access from various computing elements within the location and not creating clutter with additional cables.

It should be noted that this invention applies to base stations and/or chargers similar to those that are well known in the industry and used to power and/or charge cellular and/or cordless phones. A base station, for example, can be a device that physically supports the phone while providing electrical connections. A base station may include a power supply and charging circuits within its enclosure or it may be simply a support for the phone and a connector to the phone and the power supply and/or charging circuits may be located in a separate device, possibly a wall-mounted transformer arrangement, sometimes known as a wall-wart. Some of the charging and power supply circuit may be located in the wall-wart, some in the base station and possibly, some in the phone. A simple charger may be a wall-wart as well; the difference between it and a base station being that the charger may not support the phone. The charger or wall-wart may plug directly into the phone, possibly using a ⅛" phone jack or any other connection means available. There are many variations of charging and connection schemes and any variation does not veer from this invention.

It is to be understood that both the forgoing general description and the following detailed description are exemplary only and are not restrictive of the invention as claimed. The general functions of this invention may be combined in different ways to provide the same functionality while still remaining within the scope of this invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently discussed embodiment of the invention, an example of which is illustrated in the accompanying drawings.

Figure 1:
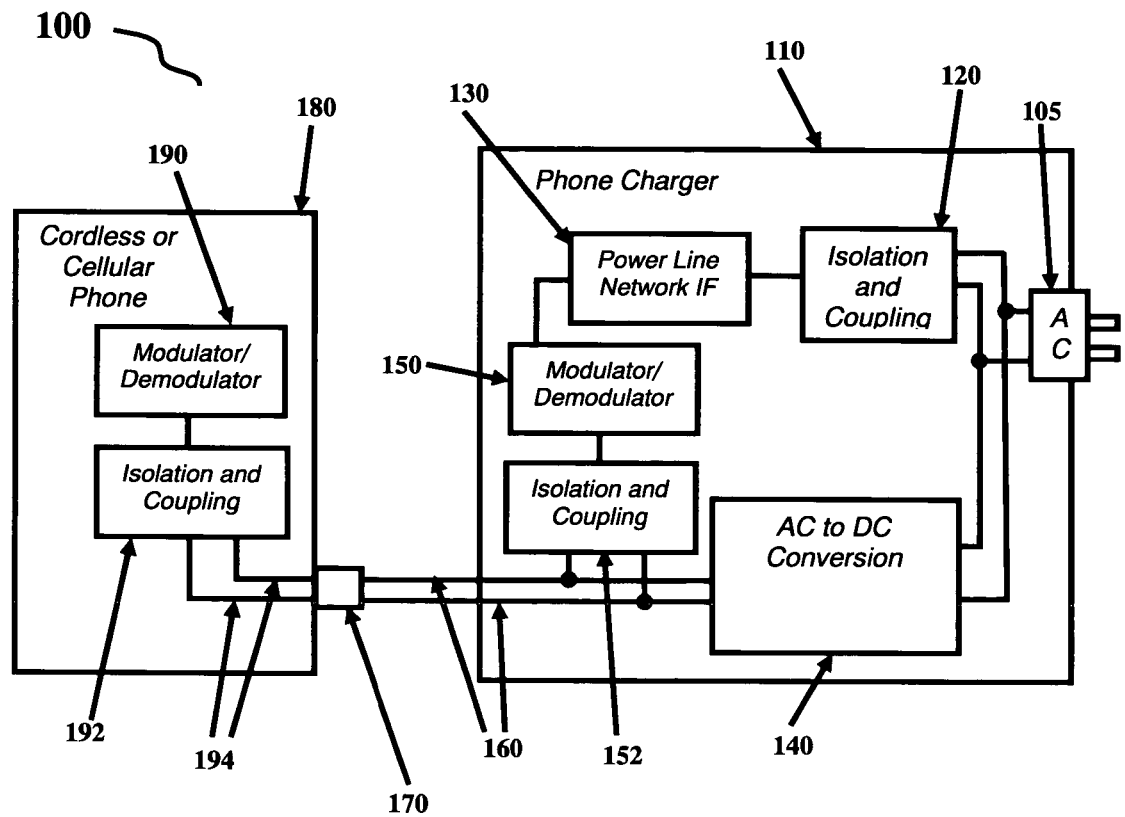
FIG. 1 shows a block diagram of a phone charger and phone with power line network capability where the network data is transferred to the phone by modulation over the charging power connection.

Referring now to FIG. 1, a block diagram of a phone charger and phone with power line network capability where the network data is transferred to the phone by modulation over the charging power connection is described. The block diagram of the phone charger 110 includes an AC input connector 105 that is coupled to an AC to DC power conversion circuit 140. In current practice, DC power is most widely used to power and charge the phone, though in another embodiment AC power is used and power conversion circuit 140 would convert AC power into AC power, perhaps a lower voltage AC power and/or at a higher frequency. The phone charger includes coupling and isolation components for power line networking 120. The coupling and isolation components 120 couple the power line networking signals to and from the AC power while blocking and/or isolating high voltage AC power.

Power line networking interface 130 receives and sends networking data through coupling and isolation components 120 and receives and sends data to the phone through modulator/demodulator 150 and isolation and coupling 152. Although it is known for these types of phone chargers to have multiple output voltages, the example shows an embodiment with one DC output. In this example, the DC output is conducted on wires 160 through connector 170 to power phone 180. Connector 170 may be of any type known in the industry. Wires 160 may be bundled together in one cable and may be of any length, but usually are between a few feet and a few yards. Phone 180 may obtain its operating and charging power from the DC voltages present on wires 160, but for simplicity purposes, the power connections of system 180 to wires 160 and connector 170 are not shown, nor are the conditioning circuits. Generally, the DC voltages may be routed to a power conversion circuit within phone 180 to further condition the DC power and generate whatever voltages are required to charge and/or operate phone 180. For example, the DC voltages on wires 160 may be approximately 9V, and the power conversion circuit within system 180 may convert that voltage to voltages required by the components within the phone, for example 3.3V and 5V as well as provide charge current to the phone's internal battery. It is also possible that one or more AC voltages are provided by AC to DC conversion circuit 140, making this possibly an AC to AC conversion.

Network data is transferred over the DC voltage 160 in a modulated fashion. It is well know in the industry how to modulate data over a DC voltage and any method may be used, including frequency modulation, pulse width modulation, Orthogonal Frequency Division Multiplexing (OFDM), quadrature modulation, Quadrature Amplitude Modulation (QAM), for example. Isolation and coupling circuit 192 transfers the modulated signal between the DC input voltages 194 and the modulator/demodulator 190 within phone 180. The data is then transferred to and from the phone's 180 internal processing components that are not shown for simplicity reasons.

Figure 2:
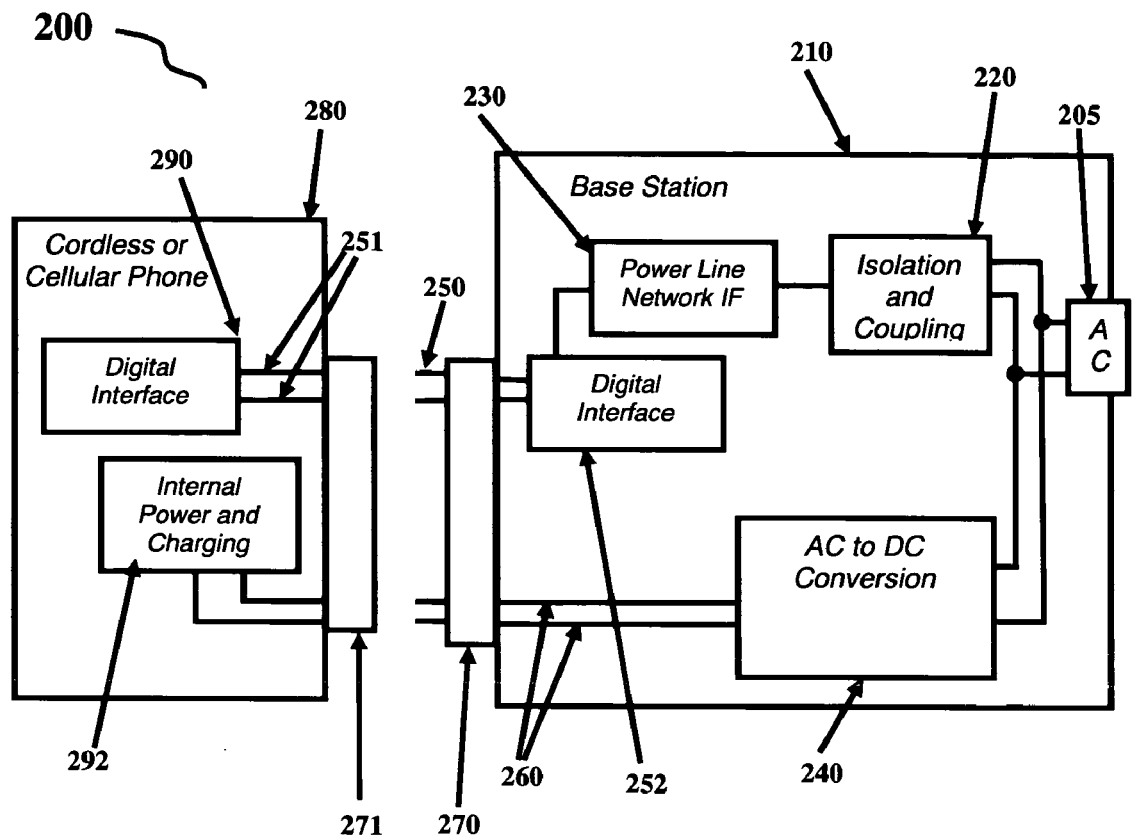
FIG. 2 shows a block diagram of a phone charger and phone with power line network capability where the network data is transferred to the phone by modulation over a separate data connection, perhaps a second set of contacts on a connector.

Referring now to FIG. 2, a block diagram of a phone base station and phone with power line network capability where the network data is transferred to the phone by a data connection is described. The block diagram of the phone base station 210 includes an AC input connector 205 that is coupled to an AC to DC power conversion circuit 240. In another embodiment of this invention, power conversion circuit 240 converts AC to AC power, perhaps at a lower voltage and/or at a higher frequency. The phone charger includes coupling and isolation components for power line networking 220. The coupling and isolation components 220 couple the power line networking signals to and from the AC power while blocking and/or isolating high voltage AC power.

Power line networking interface 230 receives and sends networking data through coupling and isolation components 220 and receives and sends data to phone 280 through digital interface 252 and separate conductors 250 of connector 270. Although it is known for these types of phone base stations to have multiple output voltages, the example shows an embodiment with one DC output. In this example, the DC output is conducted on wires 260 to connector 270 which mates with connector 271 of phone 280. Connectors 270 and 271 may be of any type known in the industry. AC voltages would work equally as well. Power from the DC voltages present on wires 260 pass through connectors 270 and 271 and power and/or charge phone 280 through internal power and charging circuit 292. Internal power and charging circuit 292 generates whatever voltages are required to charge and/or operate phone 280. For example, the DC voltages on wires 260 might be approximately 9V and the internal power and charging circuit 292 may convert that voltage to voltages required by the components within the phone 280, for example 3.3V and 5V as well as provide charge current to the phone's internal battery.

Network data is transferred between base station 210 and phone 280 through contacts 250 of connector 270 which mate with contacts 251 of connector 271 located on phone 280. Although shown as two conductors, any number of conductors may be used depending upon the method by which data is transferred between base station 210 and phone 280. Data may be transferred by any means known in the industry, in serial or parallel. A standard interface may be used such as RS-232 or Universal Serial Bus, for example, or a proprietary interface may be used. The data signals may have their own ground return or may use one of the power connections as a ground return. The data is then transferred to and from the phone's 280 digital interface 290 and eventually to internal processing components that are not shown for simplicity reasons.

Figure 3:
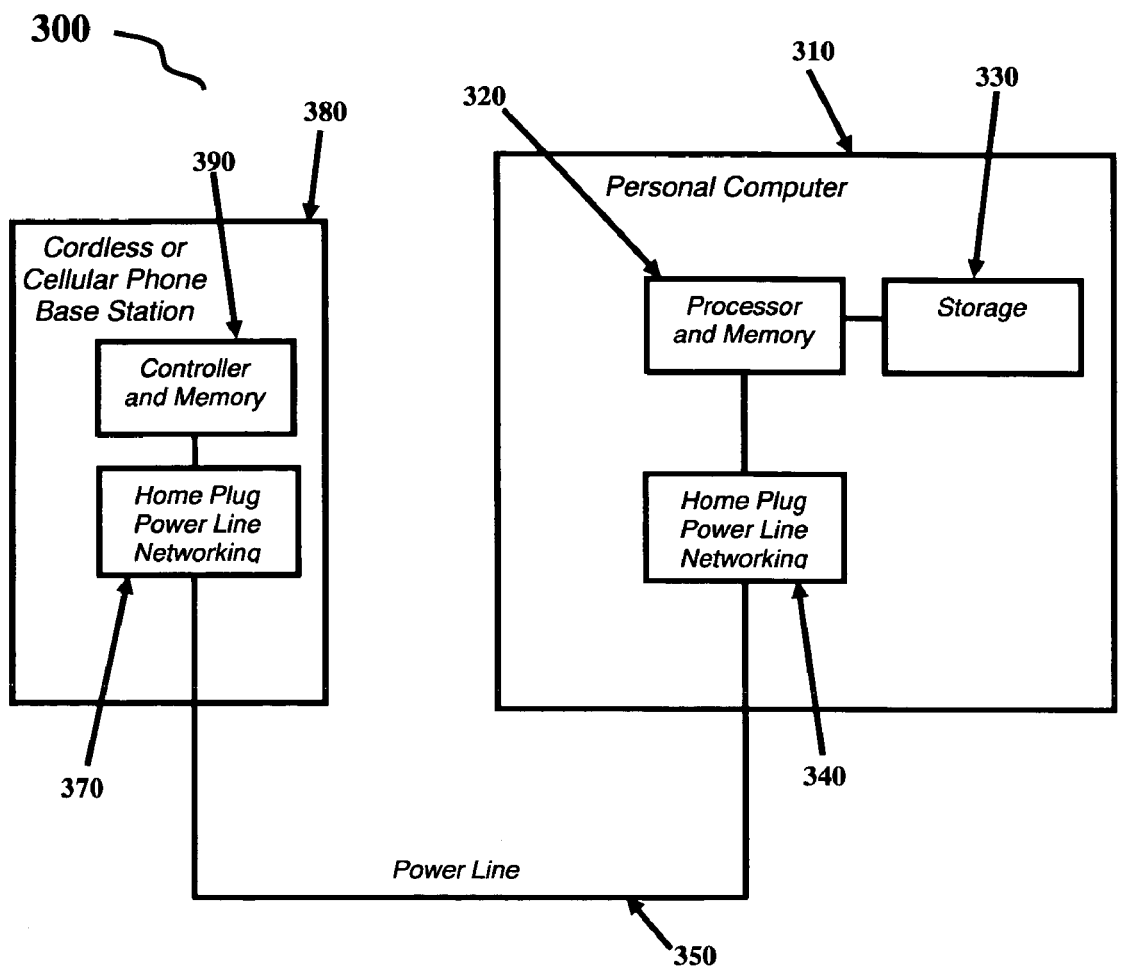
FIG. 3 shows a block diagram of a phone connected to a personal computer through the power line network interface.

Referring now to FIG. 3, an end-to-end system with a phone networked to a personal computer is described. In this example, personal computer 310 has a processor and memory 320 and storage 330. In this example, perhaps storage 330 is a persistent storage device, possibly a hard drive or flash memory. Also, contained within storage 330 may be information that may be useful to be downloaded to the phone, for example, an address book or an address book entry. Connected to the processor and memory 320 is a Home Plug power line networking interface 340. This interface 340 receives and transmits networking signals to and from processor and memory 320 over power line 350 to other devices connected to the same power line. In this case, networking signals are sent and received to and from a similar Home Plug power line networking interface 370 within the cordless or cellular phone base station 380. It should be noted that in previous embodiments, it was shown that this interface may be made in different ways and may be part of a wall-wart or other means of embodiment without veering from the intent of the present invention. Interface 370 is then connected to the controller and memory 390 of a phone that is connected to the base station or wall-wart. Being that interface 370 and interface 340 provide a data connection between personal computer 310 and the phone, data such as the address book or address book entry may be transferred over power line 350 between personal computer 310 and the phone. Alternately, data may emanate at the phone and transfer into personal computer 310 for storage in storage device 330 or the like.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A portable phone system comprising:
    a portable phone;
    a power supply having a power line input and at least one power output, said at least one power output connected through a cable and connector to said portable phone; said at least one power output provides power to said portable phone;
    a power line networking signal coupling circuit connected to said power line input;
    an output power coupling circuit connected to at least one output of said at least one power output;
    a power line networking interface connected to said power line networking signal coupling circuit adapted to receive power line networking signals from said power line input and adapted to send power line networking signals to said power line input, said power line networking interface connected to said output power coupling circuit to receive data signals from said portable phone and to send data signals to said portable phone; and
    a second modulator/demodulator circuit located within said portable phone and connected to said one of said at least one power output, said second modulator/demodulator circuit receiving data signals from said first modulator/demodulator circuit over said one of said at least one power output and for sending data signals to said first modulator/demodulator circuit over said one of said at least one power output.

2. A portable phone system as claimed in claim 1, wherein said power line input is a connector suitable to receive a power cord.

3. A portable phone system as claimed in claim 1, wherein said power supply is substantially mounted within a wall-wart that plugs directly into a power outlet.

4. A portable phone system as claimed in claim 1, wherein said power line networking signal power line coupling circuit comprises a power line coupling capacitor and a power line isolation transformer.

5. A portable phone system as claimed in claim 1, wherein said output power coupling circuit comprises an output power coupling capacitor and an output power isolation transformer.

6. A portable phone system as claimed in claim 1, wherein said power line network interface uses Home Power Line Networking Association standards to communicate with at least one device through said power line coupling circuit.

7. A portable phone system as claimed in claim 1, wherein said power line networking interface uses at least one type of modulation chosen from a group consisting of frequency modulation, pulse-width modulation, Orthogonal Frequency Division Multiplexing (OFDM), quadrature modulation and Quadrature Amplitude Modulation (QAM).

8. A portable phone system as claimed in claim 1, wherein the data signals include alphanumeric characters.

9. A portable phone system as claimed in claim 8, wherein said alphanumeric characters comprise information from an address book stored in a computer hard drive or persistent storage device.

10. A portable phone system as claimed in claim 1, wherein the data signals include information from a computer connected to the portable phone via said power line input.

11. A portable phone system as claimed in claim 10, wherein said information includes data entered into a keyboard of the computer.

12. A portable phone system comprising:
    a portable phone;
    a base station providing electrical connections and support to hold and support said portable phone;
    a power line input;
    a power conversion circuit connected to said power line input and housed within said base station, said power conversion circuit provides at least one power output that connects to and provides power to said portable phone;
a power line networking signal coupling circuit connected to said power line input;
an output power coupling circuit connected to one of said at least one power output;
a power line networking interface connected to said power line networking signal coupling circuit adapted to receive power line networking signals from said power line input and send power line networking signals to said power line input, said power line networking interface connected to a first modulator/demodulator circuit, said first modulator/demodulator circuit connected to said output power coupling circuit to receive data signals from said portable phone and send data signals to said portable phone; and
a second modulator/demodulator circuit located within said portable phone and connected to said one of said at least one power output, said second modulator/demodulator circuit receiving data signals from said first modulator/demodulator circuit over said one of said at least one power output and for sending data signals to said first modulator/demodulator circuit over said one of said at least one power output.

13. A portable phone system as claimed in claim 12, wherein said power line input is a connector suitable to receive a power cord.

14. A portable phone system as claimed in claim 12, wherein said power line networking signal coupling circuit comprises a power line coupling capacitor and a power line isolation transformer.

15. A portable phone system as claimed in claim 12, wherein said output power coupling circuit comprises an output power coupling capacitor and an output power isolation transformer.

16. A portable phone system as claimed in claim 12, wherein said first modulator/demodulator uses at least one type of modulation chosen from a group consisting of frequency modulation, pulse-width modulation; Orthogonal Frequency Division Multiplexing (OFDM), quadrature modulation and Quadrature Amplitude Modulation (QAM).

17. A portable phone system as claimed in claim 12, wherein said second modulator/demodulator uses at least one type of modulation chosen from a group consisting of frequency modulation, pulse-width modulation, Orthogonal Frequency Division Multiplexing (OFDM), quadrature modulation and Quadrature Amplitude Modulation (QAM).

18. A portable phone system comprising:
a portable phone;
a base station providing electrical connections and support to hold said portable phone;
a power supply external to said base station;
a power line input that connects to said power supply;
a power conversion circuit connected to said power line input and housed within said power supply, said power conversion circuit provides at least one power output routed through a connector located on said base station to power said portable phone;
a power line networking signal coupling circuit connected to said power line input;
an output power coupling circuit connected to one of said at least one power output;
a power line networking interface connected to said power line networking signal coupling circuit adapted to receive power line networking signals from said power line input and send power line networking signals to said power line input, said power line networking interface connected to a first modulator/demodulator circuit, said first modulator/demodulator circuit connected to said output power coupling circuit to receive data signals from said portable phone and send data signals to said portable phone; and
a second modulator/demodulator circuit located within said portable phone and connected to said one of said at least one power output, said second modulator/demodulator circuit adapted to receive data signals from said first modulator/demodulator circuit over said one of said at least one power output and adapted to send data signals to said first modulator/demodulator circuit over said one of said at least one power output.

19. A portable phone system as claimed in claim 18, wherein said power line input is a connector suitable to receive a power cord.

20. A portable phone system as claimed in claim 18, wherein said power line networking signal coupling circuit comprises a coupling capacitor and an isolation transformer.

21. A portable phone system as claimed in claim 18, wherein said output power coupling circuit comprises a coupling capacitor and an isolation transformer.

22. A portable phone system comprising:
a portable phone;
a power supply;
a power line input connected to said power supply;
a power conversion circuit connected to said power line input having at least one power output connected to said portable phone through a power cable and a connector, said power conversion circuit provides power to said portable phone;
a power line networking signal coupling circuit connected to said power line input;
an output power coupling circuit connected to one output of said at least one power output;
a power line networking interface connected to said power line networking signal coupling circuit adapted to receive power line networking signals from said power line input and adapted to send power line networking signals to said power line input, said power line networking interface connected to said output power coupling circuit to receive data signals from said portable phone and send data signals to said portable phone; and
a second modulator/demodulator circuit located within said portable phone and connected to said one of said at least one power output, said second modulator/demodulator circuit adapted to receive data signals from said first modulator/demodulator circuit over said one of said at least one power output and adapted to send data signals to said first modulator/demodulator circuit over said one of said at least one power output.

23. A portable phone system as claimed in claim 22, wherein said power line input is a connector suitable to receive a power cord.

24. A portable phone system as claimed in claim 22, wherein said power line networking signal power line coupling circuit comprises a coupling capacitor and an isolation transformer.

25. A portable phone system as claimed in claim 22, wherein said output power coupling circuit comprises a second coupling capacitor and a second isolation transformer.

26. A portable phone system as claimed in claim 22, wherein said power cable has a connector adapted to mate with a second connector located on said portable phone.

27. A portable phone system as claimed in claim 22, wherein the data signals include alphanumeric characters comprising information from an address book stored in a computer hard drive or persistent storage device.

28. A portable phone system as claimed in claim 22, wherein the data signals include information comprising data entered into a keyboard of the computer.

29. A portable phone system comprising:
a portable phone;
an external power supply;
a power line input that connects to said external power supply;
a power conversion circuit connected to said external power line input and housed within said external power supply, said power conversion circuit connected to said portable phone through a power cable and connector; said power conversion circuit provides at least one power output to power said portable phone;
a power line networking signal coupling circuit connected to said power line input housed within said external power supply;
an output power coupling circuit connected to one of said at least one power output, said output power coupling circuit housed within said external power supply;
a power line networking interface connected to said power line networking signal coupling circuit adapted to receive power line networking signals from said power line input and send power line networking signals to said power line input, said power line networking interface connected to a first modulator/demodulator circuit, said first modulator/demodulator circuit connected to said output power coupling circuit to receive data signals from said portable phone and send data signals to said portable phone, said
first modulator/demodulator circuit substantially housed within said external power supply; and
a second modulator/demodulator circuit located substantially within said portable phone and connected to said one of said at least one power output adapted to receive data signals from said first modulator/demodulator circuit over said one of said at least one output power and adapted to send data signals to said first modulator/demodulator circuit over said one of said at least one output power.

30. A portable phone system as claimed in claim 29, wherein said power line input is a connector suitable to receive a power cord.

31. A portable phone system as claimed in claim 29, wherein said power line networking signal coupling circuit comprises a coupling capacitor and an isolation transformer.

32. A portable phone system as claimed in claim 29, wherein said output power coupling circuit comprises a second coupling capacitor and a second isolation transformer.

33. A means for providing an external power supply system with power line networking to a portable phone comprising:
a means for housing said power supply system;
a means for providing power line input that passes through said means for housing;
a means for converting said power line input into at least one output voltage housed substantially within said means for housing;
a means for coupling to said power line input, said means for coupling connected to said power line input and said means for coupling substantially housed within said means for housing;
a means for coupling to at least one of said at least one output voltage, said means for coupling to at least one of said at least one output voltage substantially housed within said means for housing; and
a first means for modulating/demodulating a networking signal through said means for coupling to power line, said first means for modulating/demodulating a networking signal substantially housed within said means for housing;
a second means for modulating/demodulating a networking signal through said means for coupling to said one of said at least one output voltage, said second means for modulating/demodulating said networking signal substantially housed within said means for housing; and
a third means for modulating/demodulating said networking signals through a second means for coupling to said one of said at least one output voltage, said third means for modulating/demodulating said networking signals housed outside of said means for housing and within said portable phone.

34. A means for providing an external power supply system with power line networking to a portable phone as claimed in claim 33 wherein said means for providing power line input is a connector suitable for receiving a power cord.

35. A means for providing an external power supply system with power line networking to a portable phone as claimed in claim 33 wherein said means for coupling to power line networking signals comprises a coupling capacitor and an isolation transformer.

36. A means for providing an external power supply system with power line networking to a portable phone as claimed in claim 33, wherein the networking signal includes alphanumeric characters comprising information from an address book stored in a computer hard drive or persistent storage device.

37. A means for providing an external power supply system with power line networking to a portable phone as claimed in claim 33, wherein the networking signals include information comprising data entered into a keyboard of the computer.

38. A portable phone system comprising:
a portable phone;
a base station providing electrical connections and support to hold and support said portable phone;
a power line input;
a power conversion circuit connected to said power line input and housed within said base station, said power conversion circuit provides at least one power output that connects to and provides power to said portable phone through a connector, said connector located on a surface of said base station;
a power line networking signal coupling circuit connected to said power line input;
a power line networking interface connected to said power line networking signal coupling circuit adapted to receive power line networking signals from said power line input and send power line networking signals to said power line input, said power line networking interface sends and receives power line networking signals to and from said portable phone through separate contacts of said connector; and
a second modulator/demodulator circuit located within said portable phone and connected to said one of said at least one power output, said second modulator/ demodulator circuit adapted to receive data signals from said first modulator/demodulator circuit over said one of said at least one power output and adapted to send data signals to said first modulator/demodulator circuit over said one of said at least one power output.

39. A portable phone system as claimed in claim 38, wherein said power line input is a connector suitable to receive a power cord.

40. A portable phone system as claimed in claim 38, wherein said power line networking signal coupling circuit comprises a power line coupling capacitor and a power line isolation transformer.

41. A portable phone system as claimed in claim 38, wherein the power line networking signals include alphanumeric characters comprising information from an address book stored in a computer hard drive or persistent storage device.

42. A portable phone system as claimed in claim 38, wherein the power line networking signals include information comprising data entered into a keyboard of the computer.

* * * * *